United States Patent [19]

Howard

[11] Patent Number: 4,652,499
[45] Date of Patent: Mar. 24, 1987

[54] MAGNETIC RECORDING MEDIUM WITH A CHROMIUM ALLOY UNDERLAYER AND A COBALT-BASED MAGNETIC LAYER

[75] Inventor: James K. Howard, Morgan Hill, Calif.

[73] Assignee: International Business Machines, Armonk, N.Y.

[21] Appl. No.: 857,020

[22] Filed: Apr. 29, 1986

[51] Int. Cl.$^4$ .............................................. B32B 15/00
[52] U.S. Cl. ..................................... 428/641; 428/630; 428/634; 428/651; 428/667; 428/668; 428/928; 428/652; 428/679; 428/680; 360/134; 360/135; 360/136
[58] Field of Search ............... 428/607, 611, 928, 634, 428/641, 651, 652, 681, 626, 630, 670, 667, 668, 678, 679, 680; 360/134, 135, 136

[56] References Cited

U.S. PATENT DOCUMENTS 3,321,328  5/1967  Koretzky ........................... 427/131
4,438,066  3/1984  Aboaf .................................. 420/135

FOREIGN PATENT DOCUMENTS 140513    5/1985  European Pat. Off. .
145157    6/1985  European Pat. Off. .
57-205821 12/1982 Japan .................................. 428/667
57-198568  5/1984 Japan .

OTHER PUBLICATIONS

Koretzky, "Electroless Deposition Ferromagnetic Alloys" IBM Technical Disclosure Bulletin, vol 5, No. 2, Jul. 1962, p. 59.
J. A. Aboaf, et al., "Magnetic Properties and Structure of Co-14 Pt Thin Films", IEEE Trans, on Magnetics, MAG-19, 1514 Jul. (1983).
M. Kitada, et al., "Magnetic Properties of Sputtered Co-Pt Thin Films," J. Appl. Phys. 54(12), Dec. 1983, pp. 7089-7094.
J. E. Opfer, et al., "Thin Film Memory Disc Development," Hewlett-Packard Journal, Nov. 1985, pp. 4-10.

Primary Examiner—John P. Sheehan
Attorney, Agent, or Firm—Thomas R. Berthold

[57] ABSTRACT

An improved cobalt-platinum (CoPt) thin film metal alloy media for horizontal magnetic recording has a squareness greater than prior CoPt thin film metal alloy media. An underlayer of a body-centered-cubic (BCC) chromium-based alloy with a lattice cell constant greater than chromium (Cr), such as chromium-vanadium (CrV), is formed between the substate and the CoPt magnetic layer. The underlayer also improves the magnetic properties of the media when the magnetic layer is an alloy of cobalt-platinum-chromium (CoPtCr).

7 Claims, 4 Drawing Figures

MAGNETIC RECORDING MEDIUM WITH A CHROMIUM ALLOY UNDERLAYER AND A COBALT-BASED MAGNETIC LAYER

BACKGROUND OF THE INVENTION

1. Field of the Invention

This invention relates to thin film metal alloy magnetic recording media, and in particular to a thin film metal alloy disk for horizontal recording in which an alloy comprising cobalt and platinum forms the magnetic layer and in which a specific chromium alloy underlayer between the magnetic layer and the disk substrate improves the magnetic properties of the media.

2. Description of the Prior Art

Alloys of cobalt and platinum with various percentages of platinum concentration have been used as the magnetic material in thin film magnetic recording disks for horizontal recording. In such disks, the hexagonal close packed (HCP) crystalline structure of the cobalt-platinum (CoPt) alloy is formed on the substrate, or on an intermediate underlayer, so that the C-axis, i.e. the [002] axis, of the CoPt film is either in the plane of the film or has a component in the plane of the film.

The coercivity ($H_c$) of CoPt films is dependent upon the composition of the platinum, with the maximum $H_c$ occurring at approximately 20 atomic percent (at. %) platinum. See J. A. Aboaf, et al., "Magnetic Properties and Structure of Co-Pt Thin Films", *IEEE Trans on Magnetics*, MAG-19, 1514 (1983), and M. Kitada, et al., "Magnetic Properties of Sputtered Co-Pt Thin Films", *J. Appl. Phys.* 54 (12), December 1983, pp. 7089–7094. The coercivity and other properties of cobalt-platinum films have been reported by Opfer, et al. in an article entitled "Thin-Film Memory Disc Development," *Hewlett-Packard Journal*, November 1985, pp. 4–10. A CoPt thin film magnetic recording medium with between 10-30 at. % Pt is described in U.S. Pat. No. 4,438,066, which is assigned to the same assignee as this application.

A thin film disk with a cobalt-platinum-chromium (CoPtCr) magnetic layer, wherein chromium (Cr) is added to improve the corrosion resistance of the magnetic layer, is described in Japanese patent application No. 198568, published May 22, 1984. The CoPtCr magnetic layer is deposited onto a nickel-phosphorus (NiP) film formed on a suitable substrate.

In order to improve the magnetic properties of the CoPt magnetic layer in certain types of disks, various types of underlayers may be formed between the substrate and the CoPt magnetic layer. The use of a Cr underlayer in a CoPt thin film disk is described in the above referenced article by Opfer, et al. and in European patent application No. 145157, published June 19, 1985 and assigned to the Hewlett-Packard Company. European patent application No. 140513, published May 8, 1985, and assigned to the same assignee as this application, describes various magnetic recording structures for horizontal recording in which a Co-based HCP magnetic layer is deposited onto a Co-based primarily body-centered-cubic (BCC) non-magnetic layer. One of the possible structures suggested in the European reference is a CoPt magnetic layer, with Pt between 1 and 35 at. %, formed on a XCo layer, where X is either Cr or vanadium (V) with X between 60 and 99 at. %. The European reference suggests that the in-plane orientation of the C-axis of the HCP magnetic layer is enhanced because of "pseudo lattice" matching of the (002) plane of the BCC underlayer with the (110) plane of the HCP magnetic layer.

SUMMARY OF THE INVENTION

The present invention is an improved CoPt or CoPtCr thin film magnetic recording disk for horizontal recording and incorporates a nonmagnetic underlayer of a body-centered-cubic (BCC) chromium alloy between the substrate and the CoPt or CoPtCr magnetic layer to improve the magnetic properties of the disk. The BCC Cr alloy is one which has a lattice cell constant, denoted $a_{BCC}$, greater than that of BCC CrCo or BCC Cr alone, such as chromium-vanadium (CrV) or chromium-iron (CrFe), and which thus more closely matches the lattice structure of the hexagonal-close-packed (HCP) CoPt or CoPtCr crystallites in the magnetic layer.

For a further understanding of the nature and advantages of the present invention, reference should be made to the following detailed description taken in conjunction with the accompanying drawing.

DESCRIPTION OF THE PREFERRED EMBODIMENTS

In order to note the improved magnetic properties of the CoPt disk made according to the present invention, CoPt disks were first made with Cr and chromium-cobalt (CrCo) underlayers between the substrate and the CoPt magnetic layer. In all the following experimental examples described herein the substrate was semiconductor grade single-crystal silicon.

In the first example, a Cr underlayer of 500 Å thickness was deposited by DC magnetron sputtering onto a silicon substrate at an Argon pressure of $2 \times 10^{-3}$ Torr and a substrate temperature of 128° C. Thereafter, a 250 Å thick cobalt-platinum alloy film with 20 at. % platinum ($Co_{80}Pt_{20}$) was deposited onto the Cr underlayer without breaking vacuum in the sputtering chamber. This film had a coercivity $H_c$ of 1875 Oersteds (Oe) and a squareness S of 0.90.

In a second example a thin film disk was fabricated under similar conditions with a 500 Å $Cr_{80}Co_{20}$ (20 at. % Co) underlayer and a 250 Å thick $Co_{80}Pt_{20}$ magnetic layer. This film had a coercivity $H_c$ of 1500 Oe and a squareness S of 0.88.

By comparison with these two examples, a thin film disk with a 500 Å thick $Cr_{80}V_{20}$ (20 at. % V) underlayer and a 250 Å thick $Co_{80}Pt_{20}$ magnetic layer had a coercivity $H_c$ of 1775 and a squareness S of 0.96.

The results of these three examples are listed in Table 1.

TABLE 1

Magnetic Properties of $Co_{80}Pt_{20}$ With Various Underlayers

| | | | |
|---|---|---|---|
| $CoPt_{20}$ thickness (Å) | 250 | 250 | 250 |
| Underlayer Type | $Cr_{80}Co_{20}$ | Cr | $Cr_{80}V_{20}$ |
| Underlayer Thickness (Å) | 500 | 500 | 500 |

TABLE 1-continued

| Magnetic Properties of $Co_{80}Pt_{20}$ With Various Underlayers | | | |
|---|---|---|---|
| $H_c$ (Oe) | 1500 | 1875 | 1775 |
| S ($M_r/M_s$) | 0.88 | 0.90 | 0.96 |

While the coercivity of the disks with the Cr and CrV underlayers showed similar coercivities, the disk made with the CrV underlayer exhibited a higher squareness.

Figure 1:
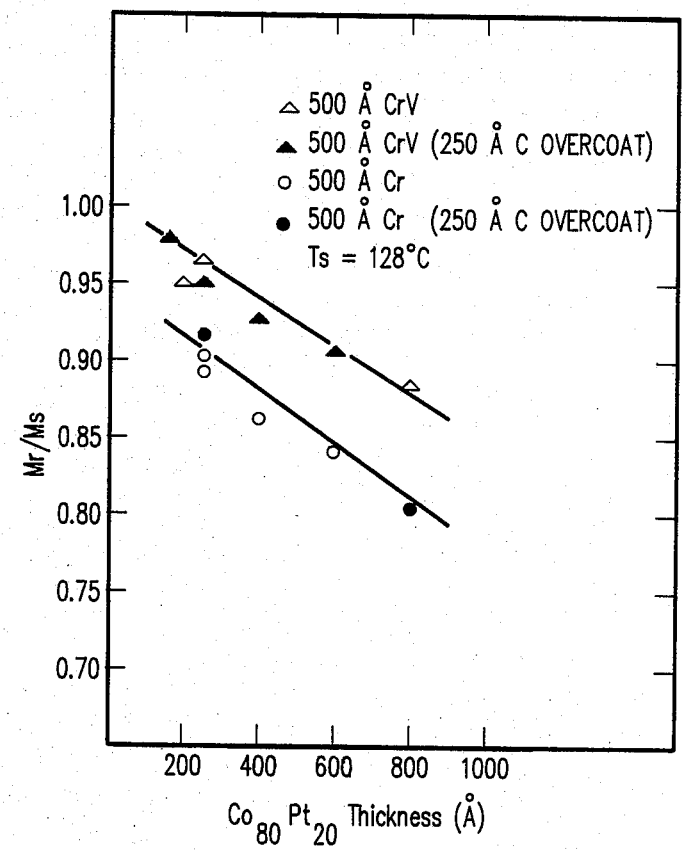
FIG. 1 is a graph of squareness $M_r/M_s$ as a function of CoPt magnetic layer thickness for different underlayers.

Illustrated in FIG. 1 are the measured squareness values, i.e. the remanence magnetization to saturization magnetization ($M_r/M_s$), for disks with Cr and CrV underlayers for various thicknesses of the $Co_{80}Pt_{20}$ magnetic layer. All of the disks from which the data of FIG. 1 was derived were formed at the same substrate deposition temperature, $T_s$, of 128° C. The data points shown in solid on FIG. 1 are for disks in which a 250 Å thick protective carbon overcoat was sputter deposited over the $Co_{80}Pt_{20}$ magnetic layer.

The $Cr_{80}V_{20}$ alloy underlayer was also used in the fabrication of CoPtCr thin film alloy disks. Table 2 illustrates a comparison of the magnetic properties of two $(Co_{85}Pt_{15})_{93.5}Cr_{6.5}$ disks, one with a 400 Å Cr underlayer and one with a 400 Å $Cr_{80}V_{20}$ alloy underlayer; the other properties of the disks being identical. The CrV alloy underlayer resulted in a disk with slight improvement in coercivity $H_c$, squareness S, and coercivity squareness S*.

TABLE 2

| Magnetic Properties of $(Co_{85}Pt_{15})_{93.5}Cr_{6.5}$ With Various Underlayers | | |
|---|---|---|
| $(Co_{85}Pt_{15})_{93.5}Cr_{6.5}$ thickness (Å) | 480 | 480 |
| Underlayer Type | Cr | $Cr_{80}V_{20}$ |
| Underlayer Thickness Å | 400 | 400 |
| $H_c$ (Oe) | 1420 | 1580 |
| $M_r \cdot t$ (emu/cm$^2$) | 2.75 × 10$^{-3}$ | 3.0 × 10$^{-3}$ |
| S ($M_r/M_s$) | 0.90 | 0.915 |
| S* | 0.906 | 0.92 |

A 400 Å $Co_{80}Pt_{20}$ film deposited on a 500 Å $Cr_{80}V_{20}$ underlayer was examined by X-ray diffraction analysis. The results showed a mixture of crystallites of HCP and face-center-cubic (FCC) phases. A $Co_{80}Pt_{20}$ film of the same thickness deposited on a 500 Å Cr underlayer, on the other hand, exhibited only an HCP phase, without any observable FCC phase. When the $Cr_{80}V_{20}$ underlayer was decreased to 200 Å thickness, the coercivity of a 500 Å $Co_{80}Pt_{20}$ film decreased to 400 Oe and the dominant phase in the $Co_{80}Pt_{20}$ film was FCC. In an article by Chen, et al. in *IEEE Transaction Magnetics*, MAG-17, 3187 (1981), wherein a study of FCC phase formation in cobalt-rhenium (CoRe) alloy films was investigated, the experimental results indicated that grain size of the crystallites decreased as a result of the transformation of HCP to FCC phase. The results by Chen, et al. indicated that a reduction in coercivity of the CoRe films was affected primarily by the reduction of grain size as a result of the polymorphic phase transformation, rather than the presence of the FCC crystallites themselves. However, the high coercivity values (approximately 1550 to 1630 Oe) exhibited by the 400 Å $Co_{80}Pt_{20}$ films on the 500 Å $Cr_{80}V_{20}$ sublayers indicate that the two-phase structure does not appreciably affect the coercivity mechanism. Thus the high coercivity and high squareness of a 400 Å $Co_{80}Pt_{20}$ film over a 500 Å $Cr_{80}V_{20}$ underlayer are consistent with the formation of a two-phase microstructure in the $Co_{80}Pt_{20}$ film without a reduction in grain size.

It is believed that the improved squareness of CoPt films caused by the CrV underlayer is a result of the close lattice matching between the BCC CrV alloy and the HCP phase in the $Co_{80}Pt_{20}$ film.

Figure 2A:
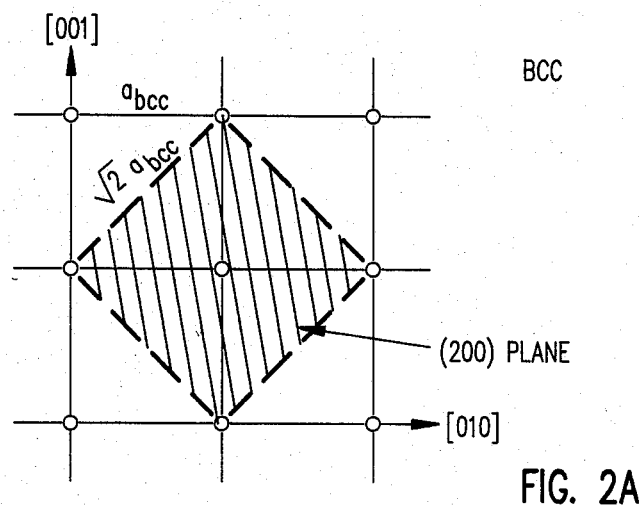
FIGS. 2A and 2B depict lattice structures for BCC and HCP crystals and the respective planes to be lattice matched.
Figure 2B:
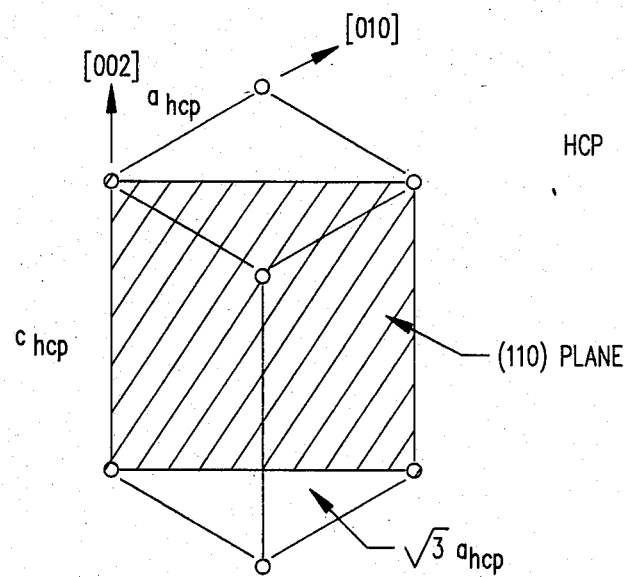

A BCC crystal has a single cell constant, $a_{BCC}$. The (200) plane of a BCC cystal is a square with dimensions $(2^{0.5})$ $(a_{BCC}) \times (2^{0.5})$ $(a_{BCC})$. See FIG. 2A. An HCP crystal has two cell constants, $c_{HCP}$ which is parallel to the [002] or C-axis, and $a_{HCP}$ which is perpendicular to the C-axis and parallel to the [010] axis. The (110) plane of the HCP crystal is rectangular with dimensions $(c_{HCP}) \times (3^{0.5})$ $(a_{HCP})$. See FIG. 2B. The HCP CoPt phase is "lattice matched" to the BCC underlayer if the (110) plane of the CoPt has similar dimensions to the (200) plane of the BCC underlayer. Table 3 lists the lattice cell constants, as determined from X-ray diffraction analysis, for $Co_{80}Pt_{20}$ disks made with Cr and Cr alloy underlayers.

TABLE 3

| Lattice Cell Constants For BCC Cr Alloy Underlayers and HCP CoPt Magnetic Layers | | |
|---|---|---|
| Example | Underlayer | Magnetic layer |
| 1. | 500 Å $Cr_{80}Co_{20}$ $a_{BCC} = 2.86$ $(2^{0.5})(a_{BCC}) = 4.044$ Å | 400 Å $Co_{80}Pt_{20}$ $a_{HCP} = 2.62$ Å $C_{HCP} = 4.221$ Å $(3^{0.5})(a_{HCP}) = 4.538$ Å |
| 2. | 500 Å Cr $a_{BCC} = 2.896$ Å $(2^{0.5})(a_{BCC}) = 4.095$ | 250 Å $Co_{80}Pt_{20}$ $a_{HCP} = 2.62$ Å $c_{HCP} = 4.227$ Å $(3^{0.5})(a_{HCP}) = 4.538$ Å |
| 3. | 1000 Å Cr $a_{BCC} = 2.888$ Å $(2^{0.5})(a_{BCC}) = 4.084$ | 400 Å $Co_{80}Pt_{20}$ $a_{HCP} = 2.62$ Å $c_{HCP} = 4.218$ Å $(3^{0.5})(a_{HCP}) = 4.538$ |
| 4. | 500 Å $Cr_{80}V_{20}$ $a_{BCC} = 2.944$ Å $(2^{0.5})(a_{BCC}) = 4.1636$ | 400 Å $Co_{80}Pt_{20}$ $a_{HCP} = 2.62$ Å $c_{HCP} = 4.222$ Å $(3^{0.5})(a_{HCP}) = 4.538$ Å |

Figure 3:
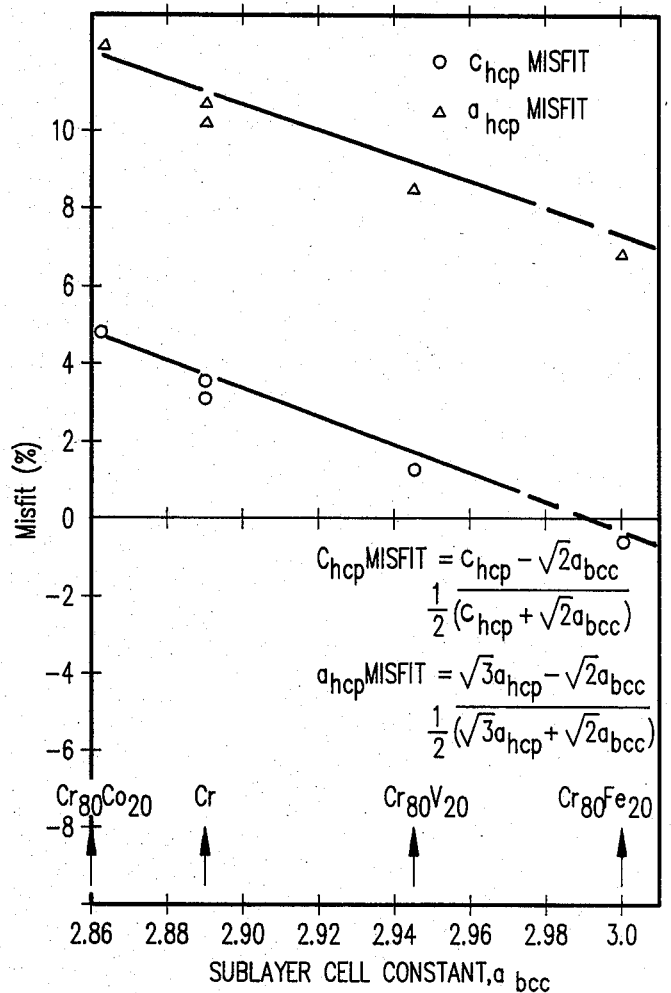
FIG. 3 is a graph of the lattice misfit between the HCP phase of CoPt and various BCC Cr alloys.

The misfit of the cell constants of the HCP CoPT magnetic layer to the respective cell constant for various BCC Cr alloy underlayers is depicted graphically in FIG. 3. As shown by FIG. 2, $Cr_{80}V_{20}$ provides a closer lattice match than either Cr or CrCo. Another alloy which has an $a_{BCC}$ value greater than that of CrCo or Cr, and which would likely provide a good lattice matching with CoPt, is chromium-iron (CrFe). The misfit of HCP $Co_{80}Pt_{20}$, assuming $a_{HCP}=2.62$ Å and $c_{HCP}=4.22$ Å, with BCC $Cr_{80}Fe_{20}$, having an $a_{BCC}=3.00$, is shown in FIG. 2. Thus, it is believed that CrFe underlayers will also result in a CoPt film with improved squareness over prior art films with CrCo and Cr underlayers.

When a silicon substrate is used, as was done in the above-described examples, an underlayer is required to improve the C-axis orientation of the HCP phase of the magnetic layer in the plane of the film. The CrV and CrFe underlayers serve this purpose. When the substrate is other material, such as a nickel-phosphorus (NiP) film formed on an aluminum alloy disk, however, an underlayer may not be absolutely necessary but only beneficial to improve the in-plane C-axis orientation. The underlayers of the present invention enhance the C-axis orientation and thereby improve the magnetic properties of the thin film disk when the substrate is a NiP film on an aluminum alloy disk.

The above description relates only to the formation of the magnetic layer and underlayer on the substrate in horizontal recording media and not to the well-known aspects of the media and the media fabrication processes. For example, in the fabrication of thin film metal alloy disks it is known to provide a protective overcoat, such as a sputtered, essentially amorphous carbon film, over the magnetic layer and in certain instances to provide an adhesion layer, such as a sputtered film of titanium, between the overcoat and the magnetic layer.

While the preferred embodiments of the present invention have been illustrated in detail, it should be apparent that modifications and adaptations to those embodiments may occur to one skilled in the art without departing from the scope of the present invention as set forth in the following claims.

What is claimed is:

1. A magnetic recording medium for horizontal recording comprising:
   a substrate;
   a nonmagnetic layer formed on the substrate from an alloy of chromium and either vanadium or iron; and
   a magnetic layer of an alloy comprising cobalt and platinum formed on the nonmagnetic layer.

2. The magnetic recording medium according to claim 1 wherein the alloy of the magnetic layer further comprises chromium.

3. The magnetic recording medium according to claim 1 wherein the substrate is silicon.

4. The magnetic recording medium according to claim 1 wherein the substrate comprises an aluminum alloy disk having a nickel-phosphorus film formed thereon.

5. The magnetic recording medium according to claim 1 further comprising a protective overcoat formed over the magnetic layer.

6. The magnetic recording medium according to claim 1 wherein the underlayer is a chromium-vanadium film having a thickness greater than approximately 200 Angstroms.

7. A magnetic recording medium for horizontal recording comprising:
   a substrate;
   a layer of chromium-vanadium alloy formed on the substrate; and
   a magnetic layer of an alloy comprising cobalt and platinum formed on the chromium-vanadium alloy layer, the magnetic layer comprising a mixed phase of HCP and FCC crystallites.

* * * * *